UNITED STATES PATENT OFFICE.

DEMITRY MINDELEFF, OF WASHINGTON, DISTRICT OF COLUMBIA, ASSIGNOR TO HIMSELF AND THOMSON H. ALEXANDER, OF SAME PLACE.

IMPROVEMENT IN PROCESSES OF TREATING ORES.

Specification forming part of Letters Patent No. 152,399 dated June 23, 1874; reissue No. 6,519, dated June 29, 1875; application filed June 19, 1875.

*To all whom it may concern:*

Be it known that I, DEMITRY MINDELEFF, of Washington, District of Columbia, have invented certain new and useful Improvements in Method of Extracting Metals from the Ore; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention has for its object the reducing to the metallic state the metals contained in silver, copper, lead, zinc, and mercury ore; also metals, in chemical combination with non-metallic substances; and to this end it consists in the application of marsh-gas ($CH_4$) and heat, substantially as hereinafter described.

The reductive quality of hydrogen gas is a fact known by chemists; but the expense attending the generating of this agent is such as to preclude its use in practical manipulations of this character. Hydrocarbon vapors have also been named as a reductive agent; but this being a generic term, no practical idea would be conveyed by its use.

The obstacles in the way of preparing and applying many of the series of hydrocarbon vapors have rendered them as reducing agents practically useless. My object has been, therefore, not only to ascertain the best possible agent for bringing the metals contained in the ore to the metallic state, but at the same time to find out which one of the series, while it should possess the above quality, should also have the advantage of economy.

By many experimental efforts I have accomplished a desideratum long sought—*i. e.*, that of having a reductive agent sufficient in its effects, combined with economy in its production, ease of manipulation, and one which will give an unfailing test or evidence of reduction. The agents which I employ are marsh-gas ($CH_4$) and heat.

I wish it particularly to be understood that I do not require the gas in a chemically pure condition, though it may be so used if economy would justify it. When I manufacture the marsh-gas from coal I distil it at a high temperature, in order to get an excess of that gas which I desire. When I use the illuminating-gas already manufactured, I pass it through a separate retort filled with red-hot coke, in order to convert the olefiant gas to marsh-gas. I can also distil this gas from wood or other substances.

To enable others skilled in the art to which my invention relates to enjoy the benefits of it, I will now describe the method of manipulation.

A retort, of convenient size and construction, is provided, which must have a door or head that can be hermetically secured when desired. The retort is furnished, near one end with a suitable pipe, through which the gas is admitted from the reservoir. This pipe is supplied with an ordinary stop-cock. At or near the opposite end of the retort is an escape-pipe, which is also provided with a stop-cock and a short branch pipe, in the end of which latter may be a gas-burner secured. The escape-pipe has its outer end bent downward, so as to enter a vessel containing water. The retort should, of course, be over a suitably-constructed furnace.

I do not wish to be understood as confining myself to any peculiar construction and arrangement of apparatus, as it is obvious that many different arrangements may be used with equal advantage without in the least departing from the essence of my invention.

The retort is charged with ore, and the head or door hermetically secured. Gas is admitted to the retort, which will soon expel the air therefrom. A strong red-heat is now applied, when the reaction at once commences. It will be noticed that during the process of reduction the gases escaping from the burner will not ignite, but as the reduction nears completion the gas will emit a dull bluish flame, and increase in tone until all the metals contained in the ore have been converted into the metallic state, when the flame will burn brightly—that is, if the gas possesses sufficient illuminating quality—as the brilliancy of the flame must, of course, depend upon the character of the gas used. In order to economize time, the retort may be thoroughly heated before the ore is introduced.

When the reduction is complete the ore is removed from the retort, placed in a furnace, and melted with suitable flux. The malleable metals will sink to the bottom and the slag will rise to the top. In case the ore contains pyrites or bisulphide of iron, it is roasted in open air before it is introduced in the retort.

In the event of the ore containing copper and silver in combination with sulphur, as usual, and it is necessary to obtain a separation of these metals after their reduction in the retort, I dissolve the spongy metals in sulphuric acid, and then separate, while in solution, the sulphate of silver from the sulphate of copper by an addition of chloride of sodium or common table-salt, which will precipitate the chloride of silver, and leave the copper in solution. The chloride of silver is then treated with heat and marsh-gas.

When the ore, besides copper and silver, contains gold and lead after the reduction by heat and marsh-gas, as described, the metals should be melted in solid mass, and this alloy treated with sulphuric acid, which will dissolve the silver and copper, and leave the gold and a portion of the lead in an insoluble state. The solution containing the silver and copper is then poured off, which is treated with chloride of sodium, as stated above, and the remaining gold and lead are melted with a suitable flux.

I would here observe that in treating the chloride of silver with marsh-gas for the purpose of reducing it to the metallic state, it is not necessary to use as high a degree of heat as when treating ores. If it is desirable to have it left after treatment in a spongy state, a dull red-heat is all sufficient.

Having thus fully described my invention, what I claim as new, and desire to secure by Letters Patent, is—

1. The process, herein described, of reducing metals contained in gold, silver, copper, lead, or zinc ores or metals, in combination with non-metallic substances, by the combined effects of heat and marsh-gas, substantially as herein set forth.

2. The method, herein described, of treating alloys of silver by first dissolving in sulphuric acid, then converting the sulphate of silver into chloride of silver by an addition of chloride of sodium, then treating with marsh-gas and heat, substantially as herein set forth.

In testimony that I claim the foregoing I have hereunto set my hand.

DEMITRY MINDELEFF.

Witnesses:

C. ALEXANDER,

W. C. MCARTHUR.